(12) United States Patent
Kobayashi et al.

(10) Patent No.: US 11,235,728 B2
(45) Date of Patent: Feb. 1, 2022

(54) SIDE AIRBAG APPARATUS

(71) Applicant: Autoliv Development AB, Vargarda (SE)

(72) Inventors: Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 31 days.

(21) Appl. No.: 16/713,129

(22) Filed: Dec. 13, 2019

(65) Prior Publication Data
US 2020/0189515 A1 Jun. 18, 2020

(30) Foreign Application Priority Data

Dec. 14, 2018 (JP) .............................. JP2018-234421

(51) Int. Cl.
*B60R 21/231* (2011.01)
*B60R 21/207* (2006.01)

(52) U.S. Cl.
CPC ...... *B60R 21/23138* (2013.01); *B60R 21/207* (2013.01); *B60R 2021/23146* (2013.01)

(58) Field of Classification Search
CPC .......................................... B60R 2021/23146
See application file for complete search history.

(56) References Cited

U.S. PATENT DOCUMENTS

| 5,842,738 | A | * | 12/1998 | Knoll | B60N 2/888 |
| | | | | | 297/216.12 |
| 6,220,624 | B1 | | 4/2001 | Abraham et al. | |
| 9,434,341 | B2 | * | 9/2016 | Kaneko | B60R 21/207 |
| 9,533,648 | B2 | | 1/2017 | Fujiwara | |
| 9,616,791 | B2 | | 4/2017 | Awata et al. | |
| 2014/0070594 | A1 | | 3/2014 | Awata et al. | |
| 2016/0159306 | A1 | | 6/2016 | Fujiwara | |
| 2017/0088078 | A1 | | 3/2017 | Nagasawa et al. | |
| 2018/0304847 | A1 | | 10/2018 | Malapati et al. | |
| 2019/0135219 | A1 | | 5/2019 | Kobayashi et al. | |
| 2019/0248322 | A1 | * | 8/2019 | Herzenstiel | B60R 21/207 |
| 2020/0122610 | A1 | * | 4/2020 | Tanaka | B60N 2/4279 |
| 2021/0046895 | A1 | * | 2/2021 | Kobayashi | B60R 21/26 |

FOREIGN PATENT DOCUMENTS

| DE | 10253472 A1 | | 6/2004 |
| JP | 07117600 A | | 5/1995 |
| JP | 1071918 A | | 3/1998 |
| JP | 10071917 A | * | 3/1998 |
| JP | 2015168295 A | | 9/2015 |

(Continued)

OTHER PUBLICATIONS

Office Action received for the European Patent Application No. 19216320.2, dated Nov. 27, 2020, 4 pages.

*Primary Examiner* — Faye M Fleming
(74) *Attorney, Agent, or Firm* — Harness, Dickey & Pierce, P.L.C.; Stephen T. Olson

(57) ABSTRACT

A side airbag apparatus includes a support part having a reaction force surface for receiving the deployment force of an airbag upon expanding and deploying the airbag. An inflator is fixed to the support part. A variable mechanism is configured to attach the support part to a seat frame such that the angle of the reaction force surface is variable with respect to the seat frame.

20 Claims, 12 Drawing Sheets

(56) References Cited

FOREIGN PATENT DOCUMENTS

| JP | 2016107721 | A | 6/2016 |
| KR | 20040095385 | A | 11/2004 |
| WO | 0144026 | A1 | 6/2001 |
| WO | WO2012157099 | A1 | 11/2012 |
| WO | WO2017209192 | A1 | 12/2017 |

\* cited by examiner

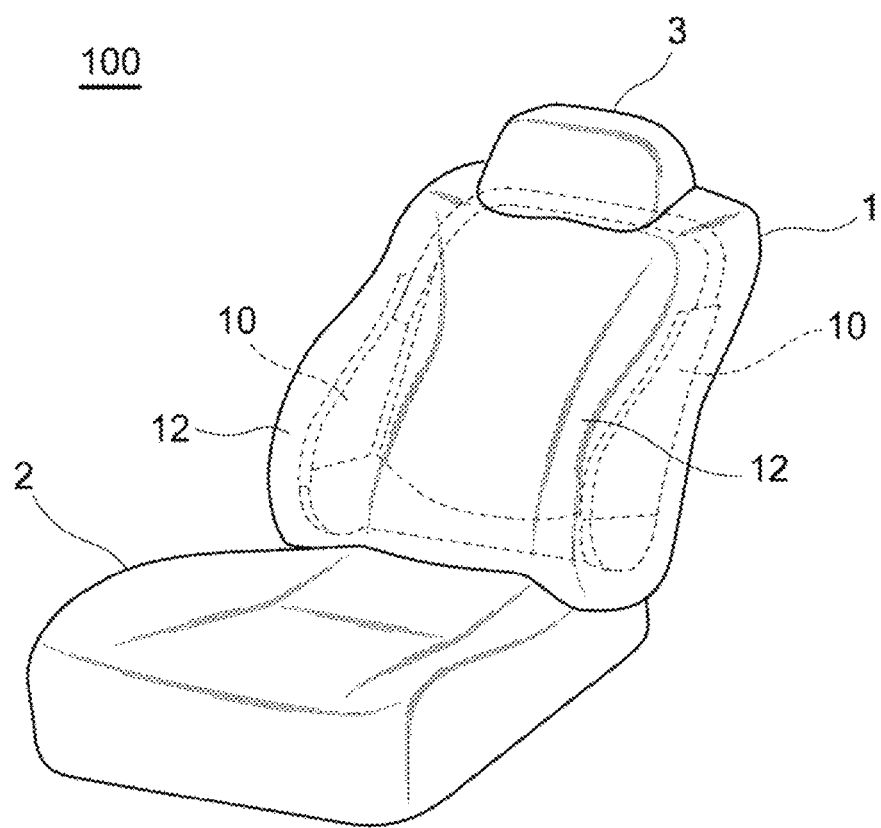
[FIG. 1]

[FIG. 2]
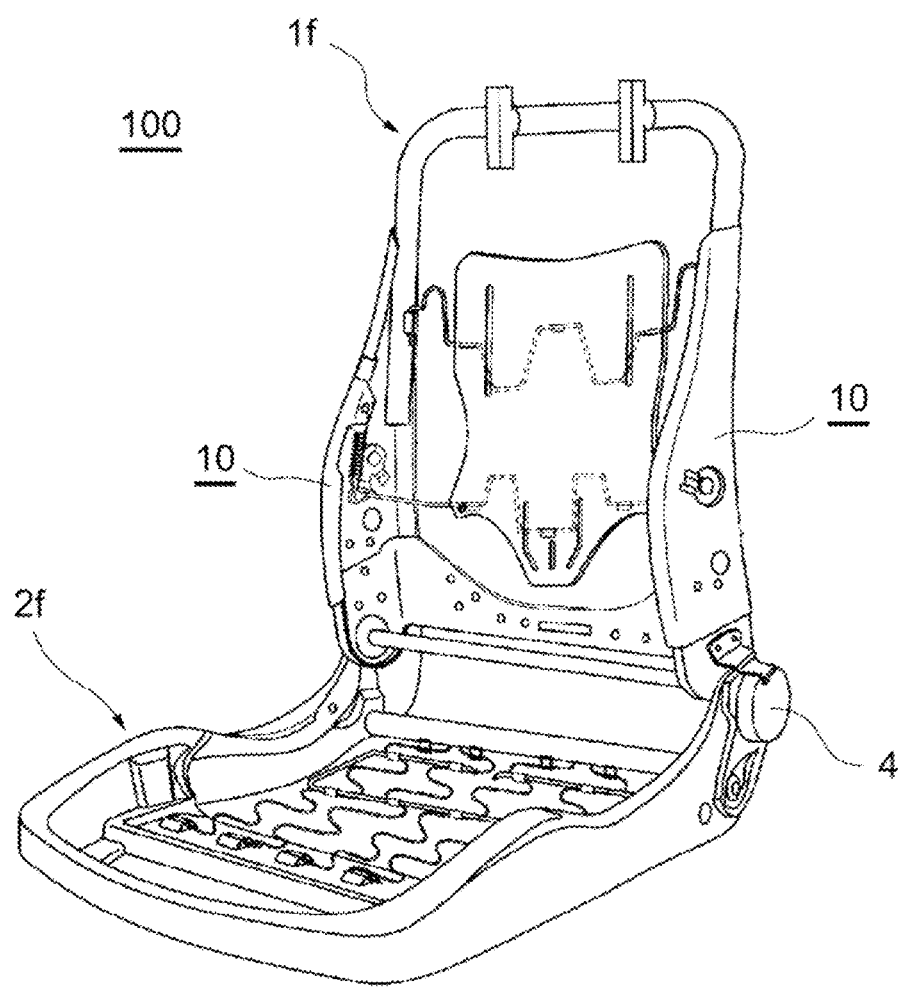

[FIG. 3A]
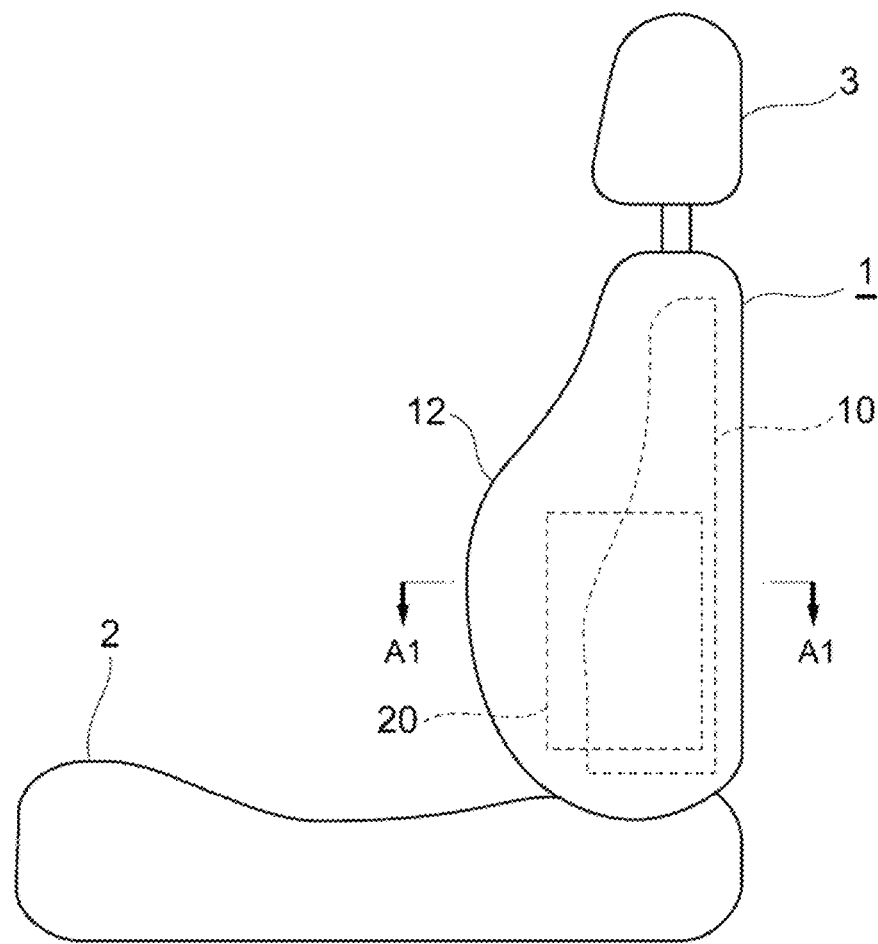
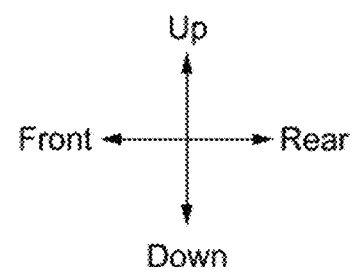

[FIG. 3B]
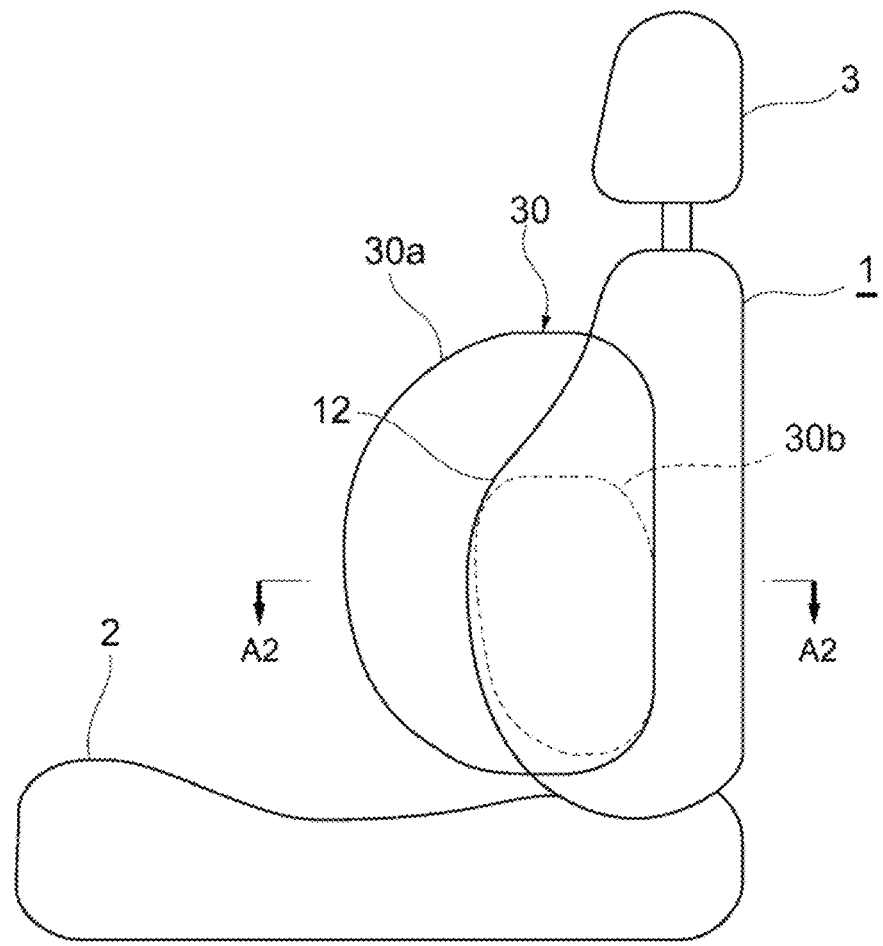
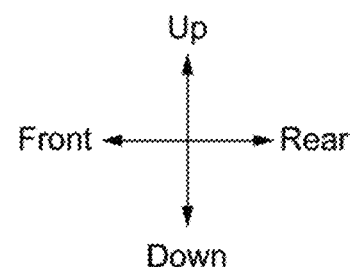

[FIG. 4]
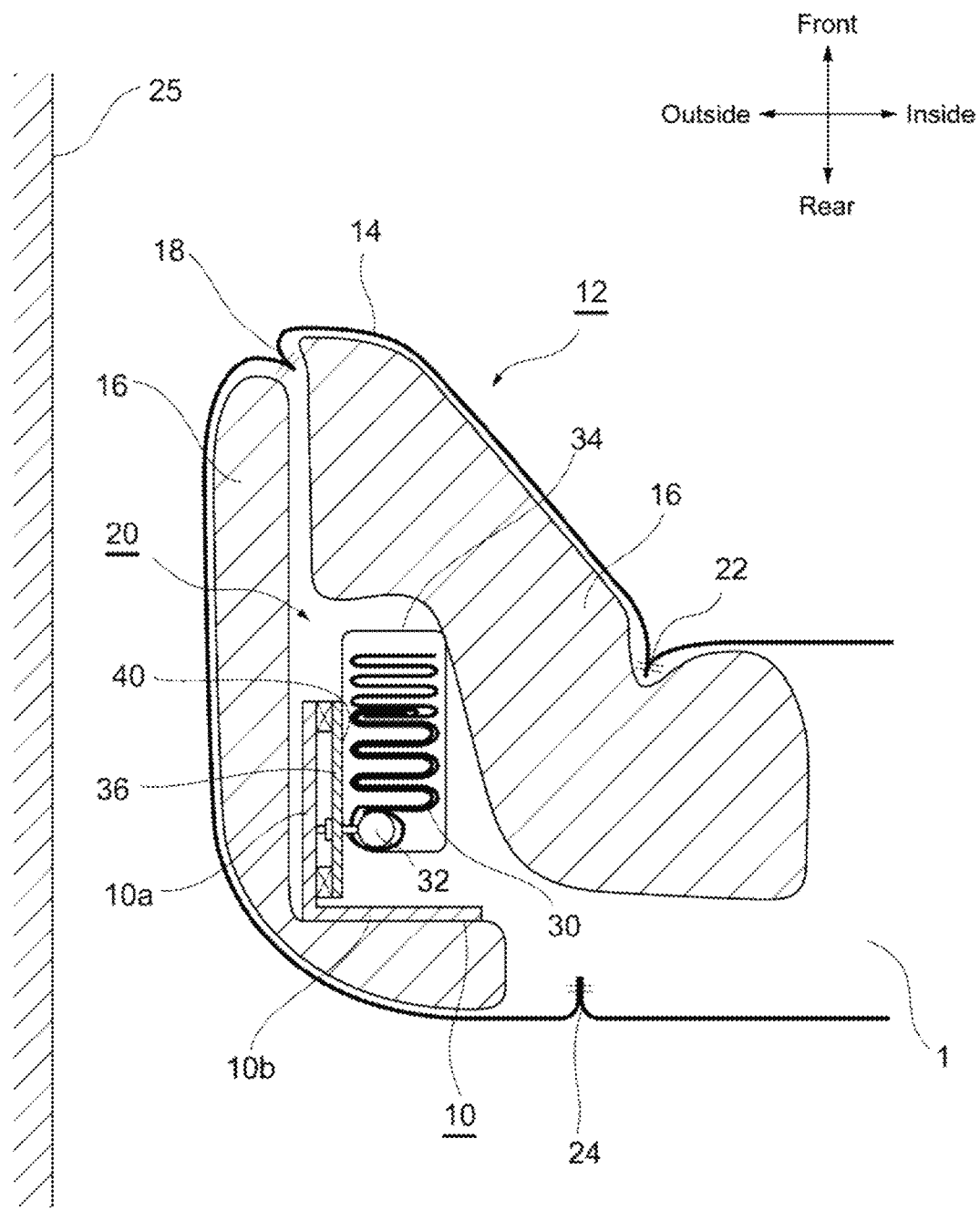

[FIG. 5]
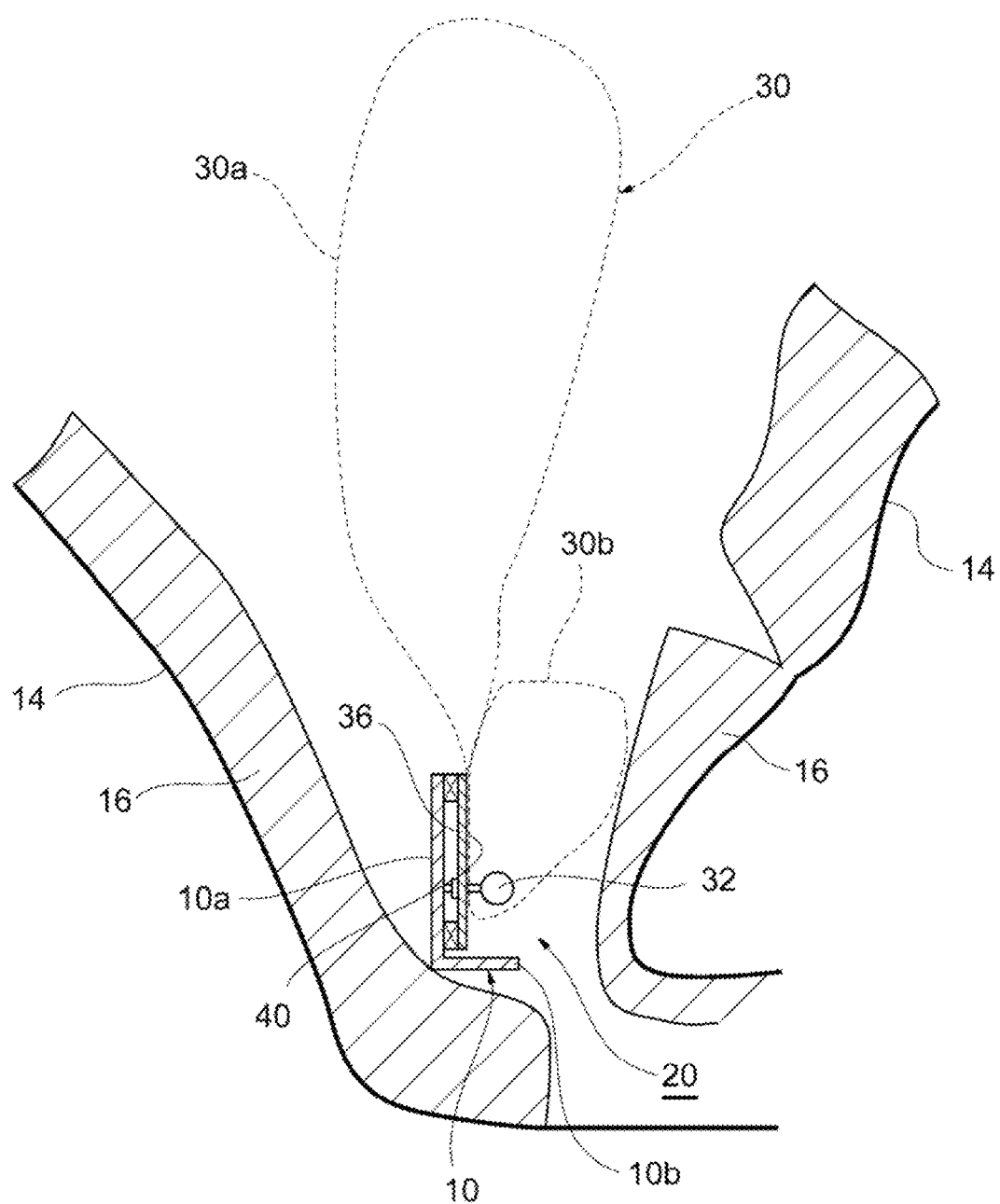

[FIG. 6A]
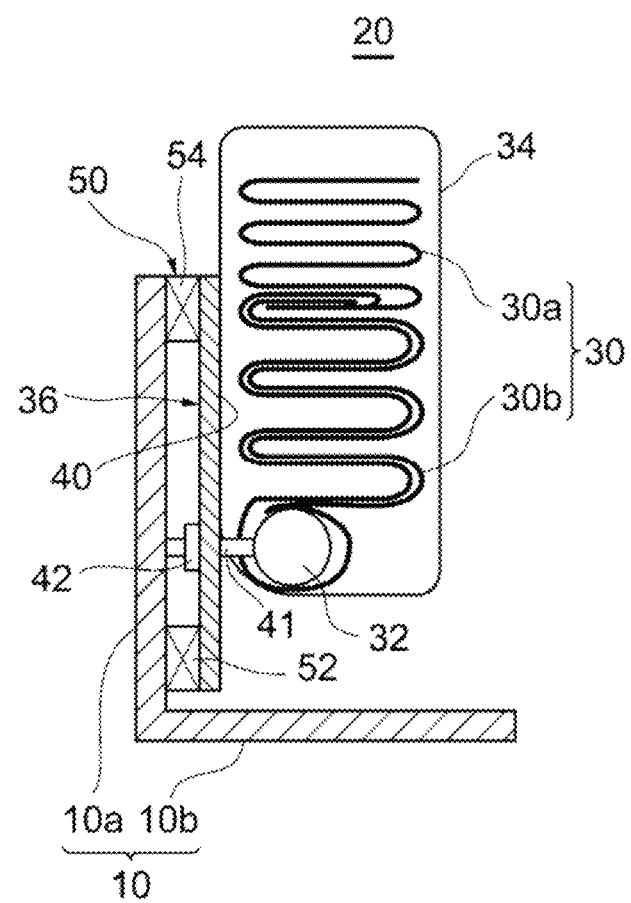

[FIG. 6B]
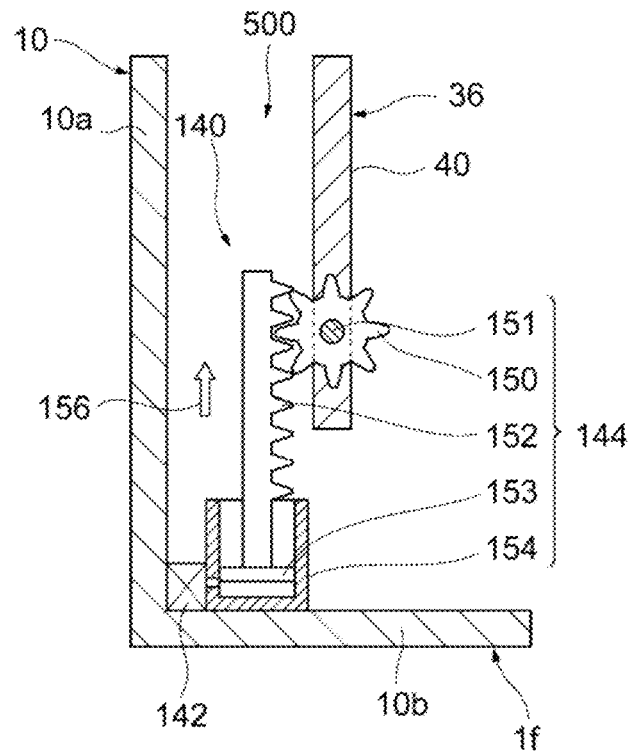
[FIG. 7A]
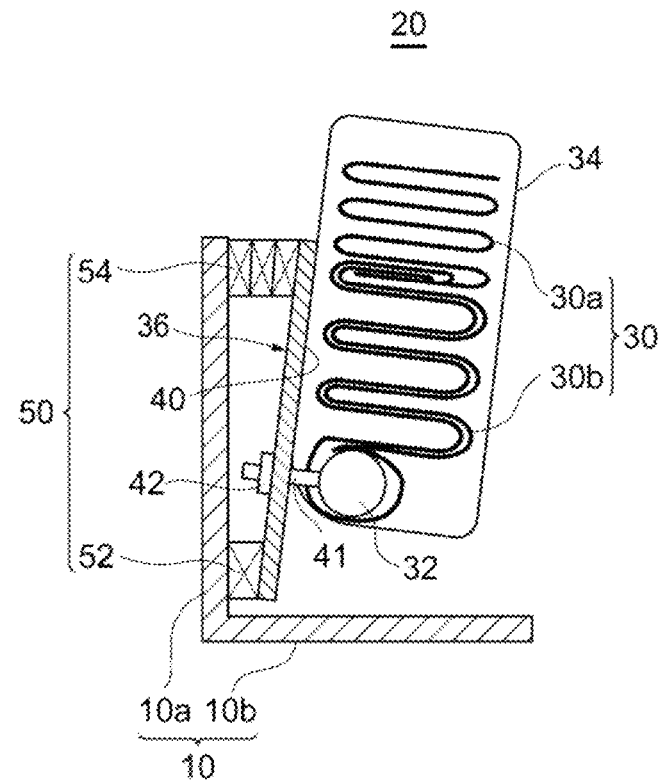

[FIG. 7B]
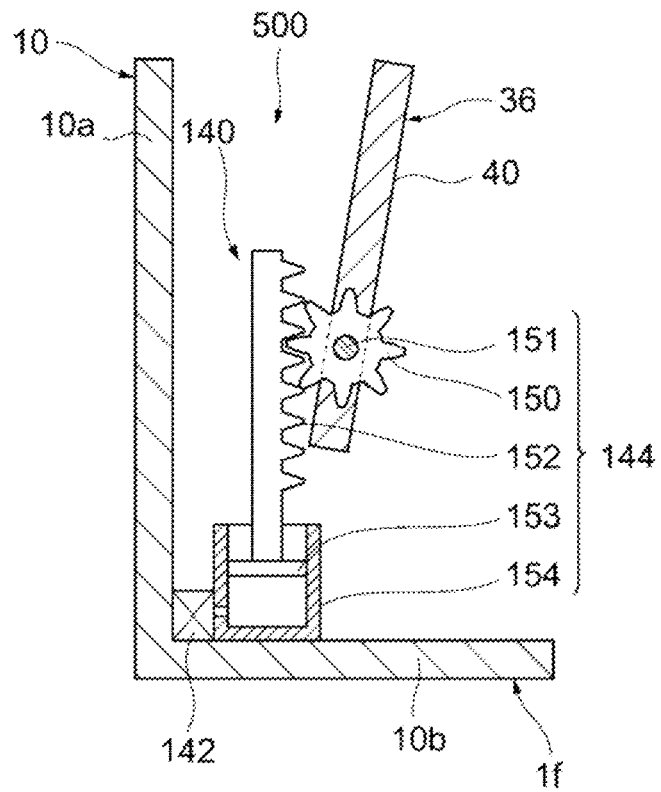
[FIG. 8A]
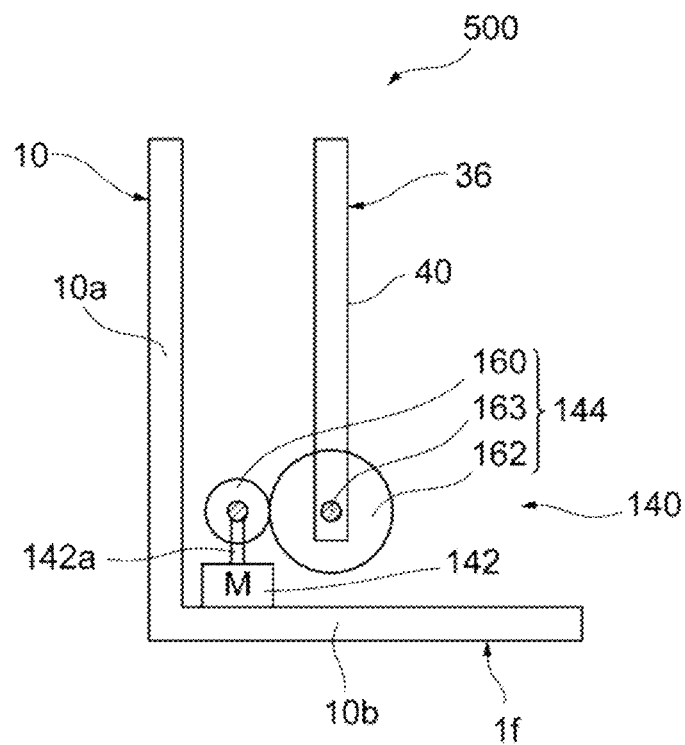

[FIG. 8B]
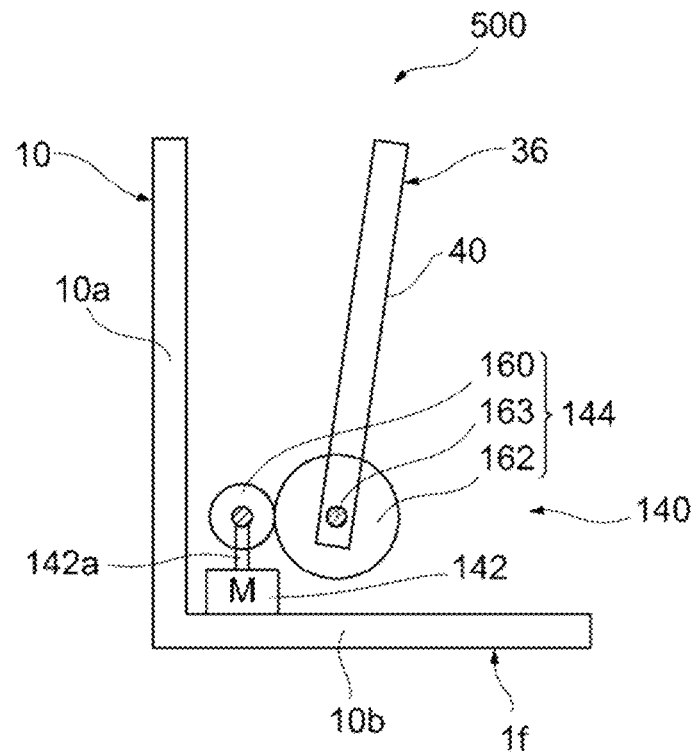
[FIG. 9A]
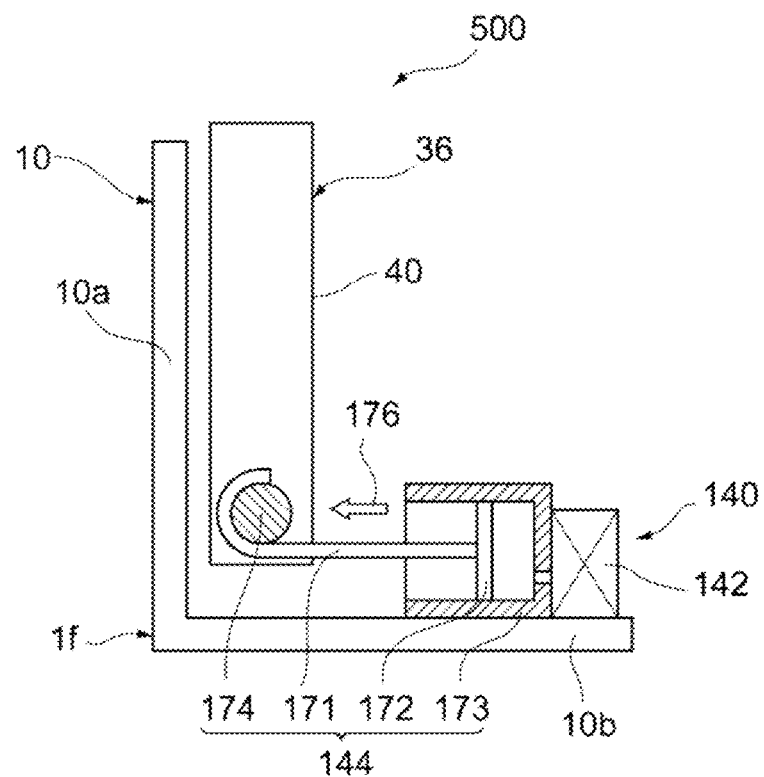

[FIG. 9B]
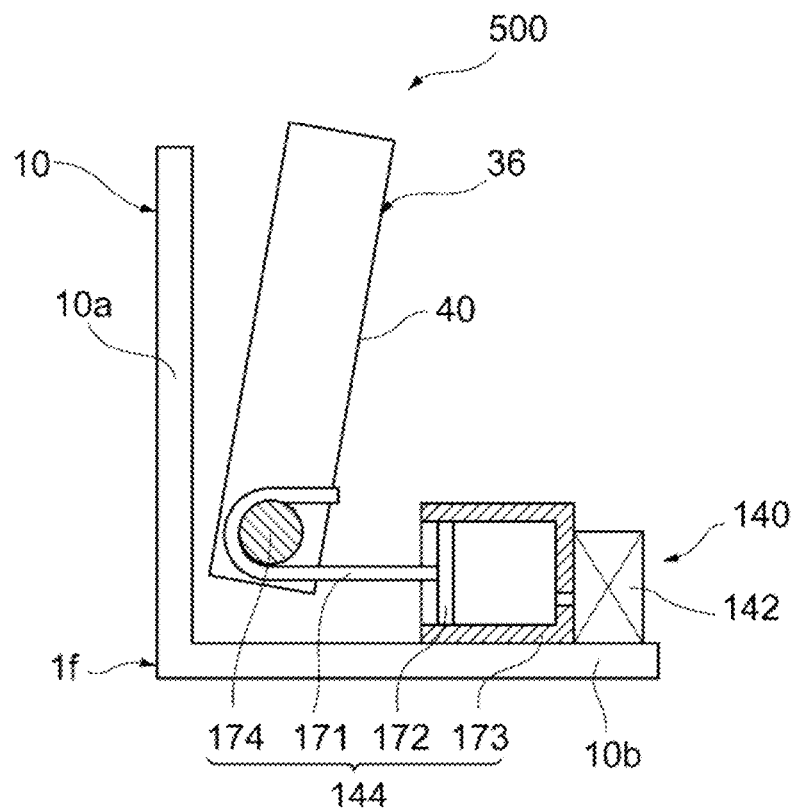
[FIG. 10A]
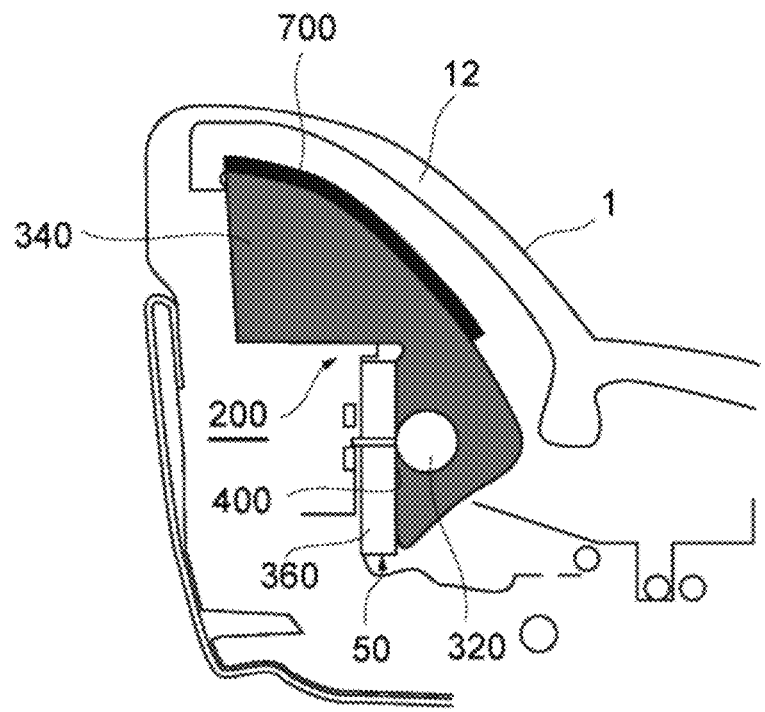

[FIG. 10B]
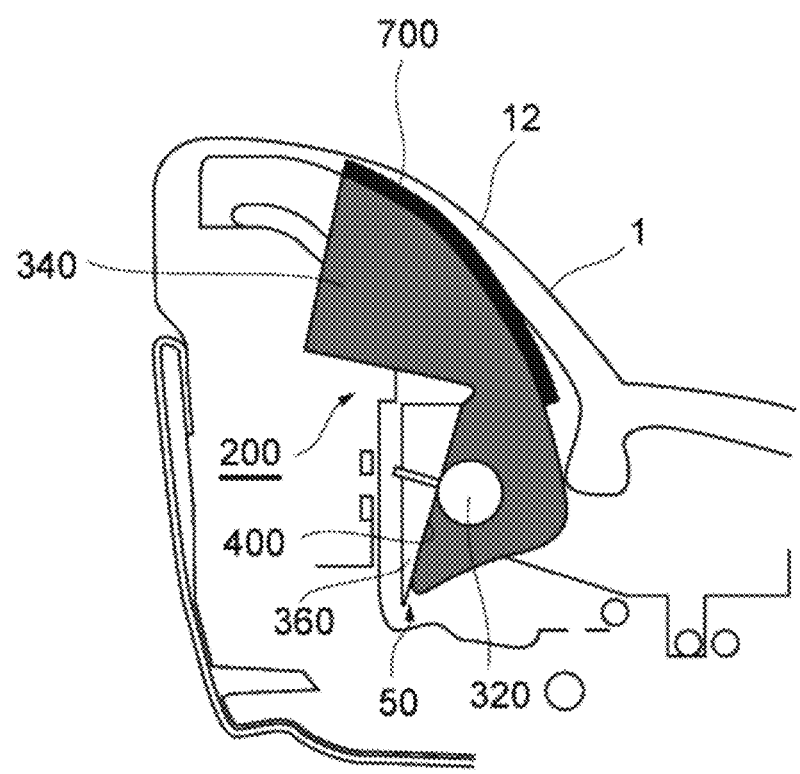

SIDE AIRBAG APPARATUS

CROSS-REFERENCE TO RELATED APPLICATIONS

This application claims the benefit of Japanese Patent Application No. 2018-234421 filed on Dec. 14, 2018, the disclosure of which is herein incorporated by reference in its entirety.

TECHNICAL FIELD

The present invention relates to a side airbag apparatus attached to a seat frame of a vehicle seat, the side airbag apparatus including: an airbag; and an inflator for supplying, to the airbag, gas for expansion and deployment.

BACKGROUND

This kind of side airbag apparatus is mounted in a vehicle in order to protect passengers seated in a vehicle seat upon a side collision of the vehicle (see Patent Documents 1 to 4). For example, as disclosed in Patent Document 1, a side airbag apparatus is embedded on the side outside the seat back in the width direction of the seat, with a portion of the airbag, along with an inflator, attached to a seat frame. In addition, upon a side collision, the airbag is expanded and deployed using gas supplied from the inflator, such that the airbag is thereby exposed outside the seat back so as to be arranged between a passenger on the seat and the side panel of the door.

RELATED ART DOCUMENTS

Patent Documents

[Patent Document 1] WO 2017-209192
[Patent Document 2] JP 2015-168295 A
[Patent Document 3] JP 2016-107721 A
[Patent Document 4] WO 2012-157099

SUMMARY OF THE INVENTION

Problem to be Solved by the Invention

In order to improve passenger protection performance, various designs have been created regarding the properties upon deploying an airbag, for example, the deployment shape, deployment behavior, deployment speed, deployment direction, etc. Unfortunately, these designs have been insufficient in terms of those riding in the vehicle. For example, in the case of a passenger with a small physique and a passenger with a large physique, the deployment direction of the airbag may presumably be different. In contrast, in conventional side airbag apparatuses, the deployment direction of the airbag is fixed in one direction.

The object of the present invention is to provide a side airbag apparatus suitable for controlling the deployment direction of an airbag.

Means for Solving the Problem

A side airbag apparatus according to one aspect of the present invention is attached to a seat frame of a vehicle seat, and includes: an airbag; an inflator for supplying, to the airbag, gas for expansion and deployment; a support part having a reaction force surface for receiving the deployment force of this airbag upon expanding and deploying the airbag, with the inflator fixed to the support part; and a variable mechanism configured to attach the support part to the seat frame such that the angle of the reaction force surface is variable with respect to the seat frame.

According to this aspect, the seat frame is not directly attached to the inflator, but rather the support part is attached to the seat frame, such that the inflator is fixed to the support part. In addition, the angle of the reaction force surface of the support part for receiving the deployment force of the airbag is variable. By changing the angle of this reaction force surface, the direction (deployment direction) for directing the expansion and deployment of the airbag can be adjusted. As a result, once the side airbag apparatus is attached to the seat frame, the deployment direction of the airbag is not fixed in any one direction, but rather can be appropriately controlled.

Effects of the Invention

The present invention enables the provision of a side airbag apparatus suitable for controlling the deployment direction of an airbag.

BRIEF DESCRIPTION OF THE DRAWINGS

FIG. 1 is a perspective view illustrating the outer shape of a vehicle seat.

FIG. 2 is a perspective view illustrating a seat frame of the seat of FIG. 1.

FIG. 3A is a schematic side view of a side airbag apparatus according to an embodiment mounted on the seat of FIG. 1, illustrating the state prior to the deployment of the airbag as seen from the outside in the width direction of the vehicle.

FIG. 3B is a schematic side view of a side airbag apparatus according to an embodiment mounted on the seat of FIG. 1, illustrating the state after the deployment of the airbag as seen from the outside in the width direction of the vehicle.

FIG. 4 is a cross sectional view along line A1-A1 of FIG. 3A, in addition to also being a view illustrating the state prior to the deployment of the airbag, along with the vehicle seat and a side panel.

FIG. 5 is a cross sectional view along line A2-A2 of FIG. 3B, in addition to also being a view illustrating the state after the deployment of the airbag, along with the vehicle seat.

FIG. 6A is a cross sectional view illustrating the state in which a support part of the side airbag apparatus according to the embodiment is disposed at a first rotation position.

FIG. 6B is a cross sectional view illustrating the state in which the support part of the side airbag apparatus according to the embodiment is disposed at a second rotation position.

FIG. 7A is a view illustrating a variable mechanism according to another embodiment, illustrating the state in which a support part is disposed at a first rotation position.

FIG. 7B is a view illustrating the variable mechanism according to another embodiment, illustrating the state in which the support part is disposed at a second rotation position.

FIG. 8A is a view illustrating a variable mechanism according to yet another embodiment, illustrating the state in which a support part is disposed at a first rotation position.

FIG. 8B is a view illustrating the variable mechanism according to yet another embodiment, illustrating the state in which the support part is disposed at a second rotation position.

FIG. 9A is a view illustrating a variable mechanism according to still another embodiment, illustrating the state in which a support part is disposed at a first rotation position.

FIG. 9B is a view illustrating the variable mechanism according to still another embodiment, illustrating the state in which the support part is disposed at a second rotation position.

FIG. 10A is a side cross sectional view illustrating the state in which a support part of a side airbag apparatus according to another embodiment is disposed at a first rotation position, along with the seat of the vehicle.

FIG. 10B is a side cross sectional view illustrating the state in which the support part of the side airbag apparatus according to another embodiment is disposed at a second rotation position, along with the seat of the vehicle.

DESCRIPTION OF THE PREFERRED EMBODIMENT

The side airbag apparatus according to the preferred embodiments of the present invention will be described with reference to the accompanying drawings. In this document, up and down, left and right, and front and rear are defined as follows. When a passenger is seated in a seat in a regular posture, the direction the passenger faces is referred to as the front, the opposite direction is referred to as the rear, and the direction indicating the coordinate axis is referred to as the anteroposterior direction. Moreover, when the passenger is seated in the seat in a regular posture, the right of the passenger is referred to as the right direction, the left of the passenger is referred to as the left direction, and the direction indicating the coordinate axis is referred to as the left and right direction. Similarly, when the passenger is seated in a regular posture, the head direction of the passenger is referred to as up, the waist direction of the passenger is referred to as down, and the direction indicating the coordinate axis is referred to as the vertical direction. Moreover, "inside" represented in the drawings refers to the inside in the width direction of the vehicle or the passenger side, while "outside" represented therein refers to the outside in the width direction of the vehicle or the door panel side.

As illustrated in FIG. 1, a vehicle seat 100 includes: a seat back 1 supporting the back of the passenger; a seat cushion 2 in which the passenger is seated; and a headrest 3 supporting the head of the passenger. The vehicle seat 100 is, for example, a driver seat or passenger seat, but may be a rear seat. The seat back 1 has a pair of left and right side support parts 12, 12 which swell forward on the side in the width direction of the vehicle. A seat frame 1f and a seating frame 2f which form the skeleton of the seat are respectively provided inside the seat back 1 and the seat cushion 2 (see FIG. 2). The seat frame 1f and the seating frame 2f are obtained by processing metal components or hard resins and are coupled to each other via a reclining mechanism 4. A pad 16 (see FIG. 4) made of a urethane foaming material, etc. is provided on the surface and periphery of the seat frame 1f and the seating frame 2f, wherein the surface of the pad 16 is covered with a skin 14 (see FIG. 4) such as leather or fabric.

As illustrated in FIG. 2, the seat frame 1f has a pair of side frames 10, 10 which are disposed so as to be separated into the left and right. The pair of left and right side frames 10, 10 extend in the vertical direction, wherein the upper ends thereof are coupled to each other via an upper frame, while the lower ends thereof are coupled to each other via a lower frame. As illustrated in FIG. 4, the side frame 10 has an L shaped cross section, wherein such an L shaped cross section is configured by: a frame side wall part 10a extending in the anteroposterior direction; and a frame rear wall part 10b extending from the rear end of the frame side wall part 10a to the inside in the width direction of the vehicle. When a side airbag apparatus 20 is fixed on the inner surface of this frame side wall part 10a, the side airbag apparatus 20 is attached to the seat frame 1f.

As illustrated in FIG. 4, the side airbag apparatus 20 has an airbag 30, an inflator 32, and a cover 34 covering the airbag 30 and the inflator 32. The cover 34 is, for example, made of fabric and flexible. Inside the side support part 12, the side airbag apparatus 20 is housed in a space with a pad 16 not disposed therein. Seams 18, 22, 24 of the skin 14 in the side support part 12 are interwoven and coupled to each other by sewing. Note that among these seams 18, 22, 24, the front seam 18 is cleft when the airbag 30 is deployed (see FIG. 5).

The airbag 30 is formed in a bag shape, for example, by sewing or adhering one or more base cloths, etc. at (an) appropriate position(s), and receives the supply of gas for expansion and deployment so as to deform from the flat state to the deployment state. The airbag 30 in the flat state is, for example, wound or folded in a roll form, an accordion form, or a combination thereof. The airbag 30 is expanded and deployed on the side of the vehicle seat 100 using gas supplied from the inflator 32. For example, the airbag 30 is expanded and deployed towards the front of and above the side support part 12 and arranged between the passenger in a regular seating state and a door trim 25 so as to restrain the passenger. As illustrated in FIGS. 3A and 3B, such an airbag 30 may have, for example, two expansion parts 30a, 30b. In addition, as illustrated in FIG. 5, the expansion part 30a may be expanded and deployed towards the front of the side support part 12, while the expansion part 30b may be expanded and deployed inside the expansion part 30a in the width direction of the vehicle.

The inflator 32 supplies, to the airbag 30, gas for expansion and deployment. The inflator 32 is electrically connected to a vehicle side ECU. For example, the inflator 32 receives a signal (which has detected the impact upon a side collision of the vehicle) from the vehicle side ECU and operates to instantly supply the gas towards the airbag 30. As the inflator 32, a variety can be employed including a gas generating agent, compression gas, or those into which both of these are filled. As one example, the inflator 32 has an ignition apparatus at the open end of a bottomed cylinder. In addition, when the gas generating agent in the cylinder is ignited using this ignition apparatus, gas is generated so as to supply the gas (for expansion and deployment) into the airbag 30 from multiple injection holes located on the peripheral surface of the cylinder.

As illustrated in FIG. 4, the side airbag apparatus 20 includes a support plate 36 to which the inflator 32 is fixed. The support plate 36 is made of a flat plate shaped member extending in the anteroposterior direction, and formed of, for example, metal components or hard resins. The length in the anteroposterior direction of the support plate 36 is approximately identical to that of the frame side wall part 10a of the side frame 10. The outer surface of the support plate 36 in the width direction of the vehicle faces the inner surface of the frame side wall part 10a. The inner surface of the support plate 36 in the width direction of the vehicle has a reaction force surface 40 for receiving the deployment force of the airbag 30 upon expanding and deploying the airbag 30. The reaction force surface 40 can be, for example, a portion over the entire inner surface of the support plate 36 in the width direction of the vehicle. The reaction force surface 40 directs the direction in which the airbag 30 is expanded and deployed in order to receive the deployment force of the airbag 30. That is, the reaction force surface 40 controls the deployment direction of the airbag 30.

The inflator 32 is fixed to an intermediate part in the anteroposterior direction of the support plate 36. The fixing of the inflator 32 will be described in detail with reference to FIG. 6A, wherein the inflator 32 is first housed inside the airbag 30. For example, the inflator 32 of the cylinder extending in the vertical direction is housed inside the expansion part 30b, wherein the outer periphery of the cylinder has a pair of upper and lower stud bolts 41 which protrude outside the expansion part 30b towards the outside in the width direction of the vehicle. The stud bolts 41 penetrate through the intermediate part in the anteroposterior direction of the support plate 36 so as to be fastened and fixed to the support plate 36 from the outside in the width direction of the vehicle using a nut 42. In this fastened and fixed state, the base cloth making up the expansion part 30b is pressed against the reaction force surface 40 of the support plate 36 using the inflator 32. Accordingly, the inflator 32 and the airbag 30 are co-fastened with the support plate 36, not the side frame 10, using the stud bolts 41 and the nut 42.

As illustrated in FIGS. 6A and 6B, the side airbag apparatus 20 includes a variable mechanism 50 configured to attach the support plate 36 to the frame side wall part 10a of the side frame 10 such that the angle of the reaction force surface 40 is variable with respect to the frame side wall part 10a. The variable mechanism 50 is provided between the support plate 36 and the frame side wall part 10a. For example, the variable mechanism 50 has a rotation holding part 52 provided on the rear side of the vehicle seat 100, along with an actuator 54 provided on the front side of the vehicle seat 100. However, in another embodiment, the rotation holding part 52 and the actuator 54 may be reversely disposed in the front and rear.

The rotation holding part 52 rotatably supports the rear end (first end) of the support plate 36 with respect to the frame side wall part 10a. The rotation holding part 52 configures the fulcrum when the front end (second end) of the support plate 36 rotates in the direction away from the frame side wall part 10a. Moreover, the rotation holding part 52 configures the attachment point of the side airbag apparatus 20 to the seat frame 1f. Such a rotation holding part 52 can be, for example, configured by a hinge. However, this is not limited thereto.

The actuator 54 applies force to the front end of the support plate 36 so as to rotate the support plate 36 about the rotation holding part 52. Specifically, the actuator 54 is fixed to the inner surface of the frame side wall part 10a in the width direction of the vehicle so as to apply force to the front end of the support plate 36 from the outside in the width direction of the vehicle to the inside in the width direction of the vehicle. As a result, as the support plate 36 is rotated, the angle of the reaction force surface 40 is varied with respect to the frame side wall part 10a. As with the rotation holding part 52, the actuator 54 configures the attachment point of the side airbag apparatus 20 to the seat frame 1f.

According to another embodiment, the actuator 54 may apply force to a portion other than the front end of the support plate 36. For example, in a portion of the support plate 36, force from the actuator 54 may be applied to a portion between the front end and the rear end opposite the front end. In so doing, regarding the support plate 36 having the reaction force surface 40 for receiving the deployment force of the airbag 30, the center part thereof can be supported by the actuator 54 from the outside in the width direction of the vehicle.

The actuator 54 can be configured of various power sources and mechanical mechanisms. For example, a motor, solenoid, hydraulic or pneumatic cylinder, or piezoelectric element can be used as the actuator 54. The motor may be combined with various mechanisms including, for example, a ball screw, gear, or rail. As one example, the motor as the actuator 54 is fixed to the frame side wall part 10a, a ball screw is coupled to an output shaft of this motor, and a ball nut screwed to this ball screw is fixed to the outer surface of the support plate 36 in the width direction of the vehicle. Alternatively, a cylinder as the actuator 54 is fixed to the frame side wall part 10a, while a piston rod of this cylinder is fixed to the outer surface of the support plate 36 in the width direction of the vehicle.

The actuator 54 is electrically connected to an ECU. This ECU may be the same as the vehicle side ECU connected to the inflator 32. The actuator 54 is operated based on a signal received from the ECU so as to rotate the support plate 36. For example, if a sensor is provided in the vehicle in order to detect the physique of the passenger on the vehicle seat 100, the ECU operates the actuator 54 such that the support plate 36 is positioned at a predetermined rotation position, in accordance with the physique of the passenger detected by this sensor. As one example, if the physique of the passenger is small, the rotation position of the support plate 36 is the position illustrated in FIG. 6A. In contrast, if the physique of the passenger is large, the rotation position of the support plate 36 is the position illustrated in FIG. 6B. In addition, as the physique of the passenger increases, the rotation position of the support plate 36 may be increased from the position illustrated in FIG. 6A to the position illustrated in FIG. 6B. The abovementioned sensor is not limited along as it can detect physiques, wherein, for example, a weight sensor embedded in the vehicle seat 100 can be used.

In another embodiment, the actuator 54 may be operated in accordance with conditions other than the physique of the passenger. For example, the ECU may operate the actuator 54 such that the support plate 36 is positioned at a predetermined rotation position, in accordance with the vehicle speed detected by the sensor provided in the vehicle. As one example, if the vehicle speed is low, the rotation position of the support plate 36 is the position illustrated in FIG. 6A. In contrast, if the vehicle speed is high, the rotation position of the support plate 36 is the position illustrated in FIG. 6B. In addition, as the vehicle speed increases, the rotation position of the support plate 36 may be increased from the position illustrated in FIG. 6A to the position illustrated in FIG. 6B.

As described above, the side airbag apparatus 20 according to the present embodiment includes the support plate 36 and the variable mechanism 50, in addition to the airbag 30 and the inflator 32. In addition, the support plate 36 has a reaction force surface 40 for receiving the deployment force of the airbag 30 upon expanding and deploying the airbag 30, in addition to fixing the inflator 32. Moreover, the variable mechanism 50 is configured to attach the support plate 36 to the seat frame 1f such that the angle of the reaction force surface 40 is variable with respect to the seat frame 1f.

According to such a configuration, when the angle of the reaction force surface 40 is changed using the variable mechanism 50, the direction (deployment direction) for directing the expansion and deployment of the airbag 30 can be adjusted. As a result, once the side airbag apparatus 20 is attached to the seat frame 1f, the deployment direction of the airbag 30 is not fixed in one direction, but rather the deployment direction of the airbag 30 can be appropriately controlled. For example, the deployment direction can be changed to a deployment direction which responds to various conditions (such as the vehicle speed or the physique of the passenger seated in the vehicle seat 100) and is suitable for each condition.

In particular, the variable mechanism 50 has: the rotation holding part 52 rotatably supporting the rear end of the support plate 36 on the seat frame 1f; and the actuator 54 for applying force to the front end of the support plate 36 so as to rotate the support plate 36 about the rotation holding part 52. In so doing, because the angle of the reaction force surface 40 can be varied by rotating the support plate 36, the deployment direction of the airbag 30 can be adjusted via a relatively simple structure. Moreover, the region for applying force for rotation serves as the region (front end of the support plate 36 opposite the rear end in the anteroposterior direction of the vehicle seat 100) as distant as possible from the fulcrum (rear end of the support plate 36) and therefore is easily rotated by a small force.

Moreover, the actuator 54 is fixed to the seat frame 1f. As a result, the attachment point of the side airbag apparatus 20 to the seat frame 1f can be configured by the actuator 54.

The embodiments described above are for ease of understanding of the present invention and are not intended to be construed as limiting the present invention. Each element included in each embodiment, as well as the arrangement, materials, conditions, shape, and size thereof, is not limited to those illustrated, but rather can be appropriately changed. For example, as a support part having the reaction force surface 40, a case shaped housing, etc. may be used instead of the support plate 36. Moreover, as the variable mechanism 50, those other than the combination of the rotation holding part 52 and the actuator 54 may be used. For example, a slide mechanism and a cam mechanism may be combined with an actuator as a power source such as a motor.

In another embodiment, as illustrated in FIGS. 7A and 7B, a variable mechanism 500 has an actuator 140 for rotating the support plate 36 (support part) with respect to the seat frame 1f. The actuator 140 has a power source 142 and a power transmission part 144, wherein the power transmission part 144 transmits power from the power source 142 to the support plate 36 in order to rotate the support plate 36. In this case, the power source 142 is attached to the seat frame 1f, while the power transmission part 144 is coupled to the power source 142 and the support plate 36, such that the variable mechanism 500 attaches the support plate 36 to the seat frame 1f.

The power transmission part 144 has, for example: a pinion gear 150; a shaft 151 with one end thereof coupled to the shaft center of the pinion gear 150, with the other end thereof coupled to the rear end of the support plate 36; a rack 152 engaging with the pinion gear 150; a piston 153 coupled to one end of the rack 152; and a cylinder 154 slidably housing the piston 153. The power source 142 is fixed, for example, to the cylinder 154, as well as to the frame side wall part 10a or the frame rear wall part 10b of the seat frame 1f, and configured by a gas generator capable of supplying high pressure gas into the cylinder 154. The power source 142 is electrically connected to the ECU and operated based on the signal received from the ECU. For example, upon changing the rotation position of the support plate 36 from the position illustrated in FIG. 7A to the position illustrated in FIG. 7B, the gas generator of the power source 142 is operated so as to supply high pressure gas into the cylinder 154. Thereupon, this acts on the piston 153, such that the rack 152 is moved in the direction of an arrow 156 (forward) so as to rotate the pinion gear 150. As a result, the shaft 151 is rotated so as to rotate the support plate 36. The rotation angle of the support plate 36 (that is, the angle of the reaction force surface 40) is variable in multiple stages in accordance with the amount of high pressure gas supplied from the gas generator.

FIGS. 8A and 8B illustrate yet another embodiment regarding the power source 142 and the power transmission part 144 of the actuator 140. The power source 142 is configured by a motor and, for example, fixed to the frame rear wall part 10b of the seat frame 1f. The power transmission part 144 has: an initial gear 160 coupled to an output shaft 142a of the motor of the power source 142; a final gear 162 engaging with the initial gear 160; and a shaft 163 coupled to the center of the final gear 162, with the shaft 163 coupled to the rear end of the support plate 36. The motor of the power source 142 is electrically connected to the ECU and operated based on the signal received from the ECU. For example, the motor of the power source 142 is driven upon changing the rotation position of the support plate 36 from the position illustrated in FIG. 8A to the position illustrated in FIG. 8B. Thereupon, the rotation of the motor is transmitted from the output shaft 142a to the initial gear 160 and the final gear 162, such that the shaft 163 is rotated so as to rotate the support plate 36. The rotation angle of the support plate 36 (that is, the angle of the reaction force surface 40) is variable in multiple stages in accordance with the rotation amount of the motor of the power source 142.

FIGS. 8A and 8B illustrate still another embodiment regarding the power source 142 and the power transmission part 144 of the actuator 140. The power transmission part 144 has: a coupling member 171 made of wire, etc.; a piston 172 coupled to the base end side of the coupling member 171; a cylinder 173 slidably housing the piston 172; and a shaft 174 around which the tip side of the coupling member 171 is wound, with the shaft 174 coupled to the rear end of the support plate 36. The power source 142 is fixed, for example, to the cylinder 173, as well as to the frame rear wall part 10b of the seat frame 1f and configured by the gas generator capable of supplying high pressure gas into the cylinder 174. The gas generator of the power source 142 is electrically connected to the ECU and operated based on the signal received from the ECU. For example, upon changing the rotation position of the support plate 36 from the position illustrated in FIG. 9A to the position illustrated in FIG. 9B, the gas generator of the power source 142 is operated so as to supply high pressure gas into the cylinder 174. Thereupon, this acts on the piston 172, such that the coupling member 171 is moved in the direction of an arrow 176 (outside the vehicle). As a result, the shaft 174 is rotated so as to rotate the support plate 36. The rotation angle of the support plate 36 (that is, the angle of the reaction force surface 40) is variable in multiple stages in accordance with the amount of high pressure gas supplied from the gas generator of the power source 142.

As described above, even in the variable mechanism 500 having the actuator 140 illustrated in the abovementioned FIGS. 7A to 9B, because the angle of the reaction force surface 40 can be varied by rotating the support plate 36, the deployment direction of the airbag can be adjusted via a relatively simple structure. Note that in FIGS. 7A to 9B, the illustration of other configurations (including the airbag 30, the inflator 32, etc.) of the side airbag apparatus 20 is omitted, with this point similar to that illustrated in FIG. 4, etc.

In another embodiment, the side airbag apparatus 20 may be employed to deform a seat back of the vehicle in accordance with the physique of the passenger. In such a side airbag apparatus 200, for example, as illustrated in FIGS. 10A and 10B, a pressing member 700 capable of pressing a seat back 1 from the inside thereof is attached to a cover 340 covering the airbag and an inflator 320. The pressing member 700 has a surface which is formed to be hard, with such a hard surface pressing the seat back 1. The hard surface of the pressing member 700 is, for example, formed of resin, a hard surface of the entire module formed by 3D compression, or a hybrid cover (partially hard surface formed by felt pressing). The region of the seat back 1 pressed by the pressing member 700 can serve as the side support part 12. The cover 340 is in contact with a support plate 360, wherein, as the support plate 360 is movable, the cover 340 is movable. Therefore, the pressing member 700 attached to the cover 340 is also movable as the angle of a reaction force surface 400 of the support plate 360 is varied by the variable mechanism 50, such that this movability causes the seat back 1 to be pressed from the inside thereof and deformed. In this manner, the side airbag apparatus 200 having the pressing member 700 is equipped with a physique adjustment mechanism. That is, because the seat back 1 can be deformed in accordance with the physique and preference of the passenger, the fit feeling of the vehicle seat to the passenger can be improved.

In another embodiment, the side airbag apparatuses 20, 200 are not limited to a near side airbag, but rather may be a far side airbag (provided in the region located opposite the vehicle door with respect to the passenger between seats). In this case, the airbag 30 to be expanded and deployed may be arranged, for example, between the vehicle seat 100 and a center console of the vehicle. The center console is, for example, disposed between two vehicle seats.

Moreover, application is also possible for airbag apparatuses other than the side airbag apparatuses. For example, application can be made to a passenger seat airbag, knee airbag, driver airbag, curtain airbag, etc. Upon the application thereof, the attachment region of the support part (support plate 36) to the vehicle side configuration (vehicle body) using the variable mechanism 50 may be a portion other than the seat frame. As one example, in the case of the passenger seat airbag, a metal instrument panel reinforcement provided inside an instrument panel with the width direction of the vehicle functioning as the longitudinal direction can serve as this attachment region. Moreover, in the case of the knee airbag, in addition to the instrument panel reinforcement, a center brace, front body pillar, column cover of a steering column, glove box, etc. can serve as this attachment region.

REFERENCE NUMERALS

1 . . . seat back, 1*f* . . . seat frame, 2 . . . seat cushion, 2*f* . . . seating frame, 3 . . . headrest, 4 . . . reclining mechanism, 10 . . . side frame, 10*a* . . . frame side wall part, 10*b* . . . frame rear wall part, 12 . . . side support part, 14 . . . skin, 16 . . . pad, 18, 22, 24 . . . seam, 20 . . . side airbag apparatus, 25 . . . door trim, 30 . . . airbag, 30*a* . . . expansion part, 30*b* . . . expansion part, 32 . . . inflator, 34 . . . cover, 36 . . . support plate (support part), 40 . . . reaction force surface, 41 . . . stud bolt, 42 . . . nut, 50 . . . variable mechanism, 52 . . . rotation holding part, 54 . . . actuator, 100 . . . vehicle seat, 140 . . . actuator, 142 . . . power source, 142*a* . . . output shaft, 144 . . . power transmission part, 150 . . . pinion gear, 151 . . . shaft, 152 . . . rack, 153 . . . piston, 154 . . . cylinder, 160 . . . initial gear, 162 . . . final gear, 163 . . . shaft, 171 . . . coupling member, 172 . . . piston, 173 . . . cylinder, 174 . . . shaft, 200 . . . side airbag apparatus, 320 . . . inflator, 340 . . . cover, 360 . . . support plate, 400 . . . reaction force surface, 500 . . . variable mechanism, 700 . . . pressing member

The invention claimed is:

1. A side airbag apparatus for attachment to a seat frame of a vehicle seat, the side airbag apparatus comprising:
   an airbag;
   an inflator for supplying, to the airbag, gas for expansion and deployment;
   a support part having a reaction force surface for receiving a deployment force of this airbag upon expanding and deploying the airbag, with the inflator fixed to the support part; and
   a variable mechanism configured to attach the support part to the seat frame such that an angle of the reaction force surface is variable with respect to the seat frame, the variable mechanism including an actuator for rotating the support part to the sear frame, the actuator including a power source and a power transmission part coupling the power source and the support part, the power transmission part operative to transmit power from the power source to the support part to rotate the support part.

2. The side airbag apparatus according to claim 1, wherein the variable mechanism includes
   a rotation holding part for rotatably supporting a first end of the support part on the seat frame; and
   wherein the actuator applies force to a portion different from the first end in a portion of the support part so as to rotate the support part about the rotation holding part.

3. The side airbag apparatus according to claim 2, wherein the portion different from the first end in the portion of the support part is a second end opposite the first end in an anteroposterior direction of the vehicle seat.

4. The side airbag apparatus according to claim 2, wherein the portion different from the first end in the portion of the support part is a portion between a second end, the second end being opposite the first end in an anteroposterior direction of the vehicle seat, and the first end.

5. The side airbag apparatus according to claim 2, wherein the actuator fixable to the seat frame.

6. The side airbag apparatus according to claim 2, wherein the actuator is fixable to an inner surface of a frame side wall part of the seat frame in a width direction of the vehicle.

7. The side airbag apparatus according to claim 3 in combination with the vehicle seat, wherein the rotation holding part is provided on a rear side of the vehicle seat, while the actuator is provided on a front side of the vehicle seat.

8. The side airbag apparatus according to claim 4 in combination with the vehicle seat, wherein the rotation holding part is provided on a rear side of the seat, and the actuator is provided on a front side of the seat.

9. The side airbag apparatus according to claim 1, wherein the actuator is operated such that the support part is positioned at a predetermined rotation position, in accordance with a physique of a passenger on the vehicle seat detected by a sensor provided in the vehicle.

10. The side airbag apparatus according to claim 2, wherein the actuator is operated such that the support part is positioned at a predetermined rotation position, in accordance with a physique of a passenger on the vehicle seat detected by a sensor provided in the vehicle.

11. The side airbag apparatus according to claim 1, wherein the actuator is operated such that the support part is positioned at a predetermined rotation position, in accordance with a vehicle speed detected by a sensor provided in the vehicle.

12. The side airbag apparatus according to claim 2, wherein the actuator is operated such that the support part is positioned at a predetermined rotation position, in accordance with a vehicle speed detected by a sensor provided in the vehicle.

13. The side airbag apparatus according to claim 1, wherein:
   the support part includes a plate shaped member extending in anteroposterior direction of the vehicle seat; and
   the inflator is fixed to an intermediate part in the anteroposterior direction of the support part.

14. The side airbag apparatus according to claim 1, wherein the support part includes a plate shaped member extending in an anteroposterior direction of the vehicle seat.

15. The airbag apparatus according to claim 1, wherein the support part has the reaction force surface in a portion over an entire inner surface in the width direction of the vehicle.

16. The side airbag apparatus according to claim 1, further comprising:
   a cover attached to the support part and covering the airbag; and
   a pressing member attached to the cover and operable to press a seat back with an internal seat frame from the inside thereof;
   wherein, as an angle of the reaction force surface is varied by the variable mechanism, the pressing member is movable so as to deform the seat back.

17. The side airbag apparatus according to claim 1 in combination with the vehicle seat, the side airbag apparatus attached to a seat frame of the vehicle seat.

18. A side airbag apparatus for attachment to a seat frame of a vehicle seat, the side airbag apparatus comprising:
   an airbag;
   an inflator for supplying, to the airbag, gas for expansion and deployment;
   a support part having a reaction force surface for receiving a deployment force of this airbag upon expanding and deploying the airbag, with the inflator fixed to the support part; and
   a variable mechanism configured to attach the support part to the seat frame such that an angle of the reaction force surface is variable with respect to the seat frame,
   the variable mechanism including a rotation holding part and an actuator, the rotation holding part for rotatably supporting a first end of the support part on the seat frame, the actuator for applying force to a portion different from the first end in a portion of the support part so as to rotate the support part about the rotation holding part.

19. A side airbag apparatus for attachment to a seat frame of a vehicle seat, the side airbag apparatus comprising:
   an airbag;
   an inflator for supplying, to the airbag, gas for expansion and deployment;
   a support part having a reaction force surface for receiving a deployment force of this airbag upon expanding and deploying the airbag, with the inflator fixed to the support part;
   a variable mechanism configured to attach the support part to the seat frame such that an angle of the reaction force surface is variable with respect to the seat frame;
   a cover attached to the support part and covering the airbag; and
   a pressing member attached to the cover and operable to press a seat back with an internal seat frame from the inside thereof;
   wherein, as an angle of the reaction force surface is varied by the variable mechanism, the pressing member is movable so as to deform the seat back.

20. A side airbag apparatus for attachment to a seat frame of a vehicle seat, the side airbag apparatus comprising:
   an airbag;
   an inflator for supplying, to the airbag, gas for expansion and deployment;
   a support part having a reaction force surface for receiving a deployment force of this airbag upon expanding and deploying the airbag, with the inflator fixed to the support part; and
   a variable mechanism configured to attach the support part to the seat frame such that an angle of the reaction force surface is variable with respect to the seat frame,
   wherein the support part includes a plate shaped member extending in an anteroposterior direction of the vehicle seat; and
   the inflator is fixed to an intermediate part in the anteroposterior direction of the support part.

* * * * *